United States Patent
Sinha

(10) Patent No.: US 12,001,269 B2
(45) Date of Patent: Jun. 4, 2024

(54) SYSTEM FOR TUNING A JAVA VIRTUAL MACHINE

(71) Applicant: Oracle International Corporation, Redwood Shores, CA (US)

(72) Inventor: Sujay Ranjan Sinha, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 34 days.

(21) Appl. No.: 17/865,237

(22) Filed: Jul. 14, 2022

(65) Prior Publication Data
US 2024/0020188 A1 Jan. 18, 2024

(51) Int. Cl.
*G06F 11/00* (2006.01)
*G06F 11/07* (2006.01)
*G06F 9/455* (2018.01)

(52) U.S. Cl.
CPC ........ *G06F 11/073* (2013.01); *G06F 11/0712* (2013.01); *G06F 11/0751* (2013.01); *G06F 11/0793* (2013.01); *G06F 2009/45583* (2013.01); *G06F 2009/45591* (2013.01)

(58) Field of Classification Search
CPC ............... G06F 11/0712; G06F 11/073; G06F 11/0751; G06F 11/0793; G06F 2009/45583; G06F 2009/45591
See application file for complete search history.

(56) References Cited

U.S. PATENT DOCUMENTS

| | | | |
|---|---|---|---|
| 8,583,783 B1 * | 11/2013 | Hayward | G06F 12/0253 709/224 |
| 9,690,644 B2 * | 6/2017 | Anderson | G06F 11/0793 |
| 9,753,846 B2 * | 9/2017 | Baluch | G06F 9/45558 |
| 2016/0371180 A1 * | 12/2016 | Urmanov | G06F 11/3075 |
| 2018/0276117 A1 * | 9/2018 | Purgason | G06F 12/0276 |
| 2020/0409731 A1 * | 12/2020 | Zhang | G06F 9/5016 |

OTHER PUBLICATIONS

Jayasena, Sanath et al., Auto-tuning the Java Virtual Machine, 2015, IEEE (Year: 2015).*

* cited by examiner

*Primary Examiner* — Marc Duncan
(74) *Attorney, Agent, or Firm* — Kilpatrick Townsend & Stockton LLP

(57) ABSTRACT

Techniques are described for tuning a Java Virtual Machine (JVM) in an automated manner. The automated tuning may be performed to improve a JVM's performance including to prevent it from failing. An auto-tuning system is described that can auto-detect one or more anomalous conditions for a JVM, and in response, take one or more corrective actions to auto-tune the JVM to avoid or reduce/mitigate any adverse impacts of the detected anomalous conditions. A corrective action taken for a JVM may include changing one or more parameters associated with the JVM.

19 Claims, 10 Drawing Sheets

SYSTEM FOR TUNING A JAVA VIRTUAL MACHINE

BACKGROUND

A Java Virtual Machine (JVM) is a program or virtual machine that enables Java programs (and other programs written in other languages that are compiled to Java bytecode) to be run or executed on different devices and operating systems. A JVM program implements a JVM specification that formally describes what is required in a JVM program implementation. There are different versions of JVM specifications. Java code is first compiled into Java bytecode. This bytecode then gets interpreted on different machines and enables the bytecode to run on the different machines. A JVM converts Java bytecode into machine code that is specific to the machine (e.g., a host machine) or hardware platform on which the program is to be executed. A JVM thus enables portability of Java programs to different operating systems and machine platforms. A JVM is also responsible for memory management. JVMs are widely used in the industry to run different programs and applications.

JVMs can be tuned to enhance their performance. Tuning a JVM typically involves changing one or more parameters associated with the JVM to match the needs of the application executed by the JVM with a goal towards enhancing the performance of the application execution. For example, tuning a JVM can include adjusting JVM-related parameters that impact the JVM's memory management, such as parameters that control the size of the JVM's heap choosing the appropriate garbage collector to be used by the JVM, and the like. Tuning a JVM may also involve performing tasks such as deleting memory objects in the JVM to free up memory. Tuning a JVM is a complicated, error prone, and labor intensive task, and is typically done manually by JVM experts. Incorrect tuning of a JVM can result in degraded performance of the JVM and can adversely impact execution of the application that is executed by the JVM.

BRIEF SUMMARY

The present disclosure relates to tuning Java Virtual Machines (JVMs). More particularly, techniques are described for tuning a JVM in an automated manner. The automated tuning may be performed to improve a JVM's performance or to prevent it from failing. An auto-tuning system is provided that can detect one or more anomalous conditions for a JVM, and in response, take one or more corrective actions to auto-tune the JVM to reduce any adverse impacts of the detected anomalous conditions. A corrective action may cause an action to be taken for the JVM and/or one or more parameters associated with the JVM to be changed. Various inventive embodiments are described herein, including methods, systems, non-transitory computer-readable media storing programs, code, or instructions executable by one or more processors, and the like.

The auto-tuning system can also be configured to auto-tune a JVM in response to seasonal trends or needs. In certain implementations, the anomalies detection, responsive auto-tuning, and seasonal tuning functionalities are offered via a cloud service provided by a cloud services provider, where the cloud service can be subscribed to by multiple customers.

Techniques are presented for monitoring the state information for a JVM. The monitored state information can indicate at least one of a number of objects stored in memory, the amount of memory used by the JVM, or a number of threads executed by applications running on the JVM. The techniques can include detecting an anomalous condition for the JVM. The techniques can include identifying a corrective action to be performed in response to the anomalous condition. The techniques can include causing a corrective action to be performed. The corrective action can include changing a parameter associated with the JVM or causing an object to be removed from heap memory.

The techniques can include detecting an anomalous condition by identifying a number of objects in the JVM. The techniques can include determining that the number of objects contain eligible objects. The techniques can include instructing the JVM to delete one or more of the eligible objects from memory.

The techniques can include issuing a corrective action by changing the amount of memory allocated to the JVM. The techniques can include detecting an anomalous condition using a rules based approach or a machine learning (ML) model.

The techniques can include identifying a seasonal trend for a customer. The seasonal trend can be applicable for a specific period of time, and the seasonal trend can be based on historical data collected for the customer. The techniques can include building a seasonal model or a set of seasonal rules based on the seasonal trend. The seasonal model can be a time series model. The techniques can include identifying an anomaly using the seasonal model or the set of seasonal rules.

The techniques can include receiving a response from the JVM. The techniques can include determining that the corrective action was not executed based on the response. The techniques can include identifying an alternative corrective action that is different than the corrective action that was not executed. The techniques can include causing the alternative corrective action to be performed.

The techniques performing the techniques as part of a cloud service. The techniques can include identifying a corrective action using a rules based approach or a machine learning (ML) model.

The foregoing, together with other features and embodiments will become more apparent upon referring to the following specification, claims, and accompanying drawings.

DETAILED DESCRIPTION

Figure 1:
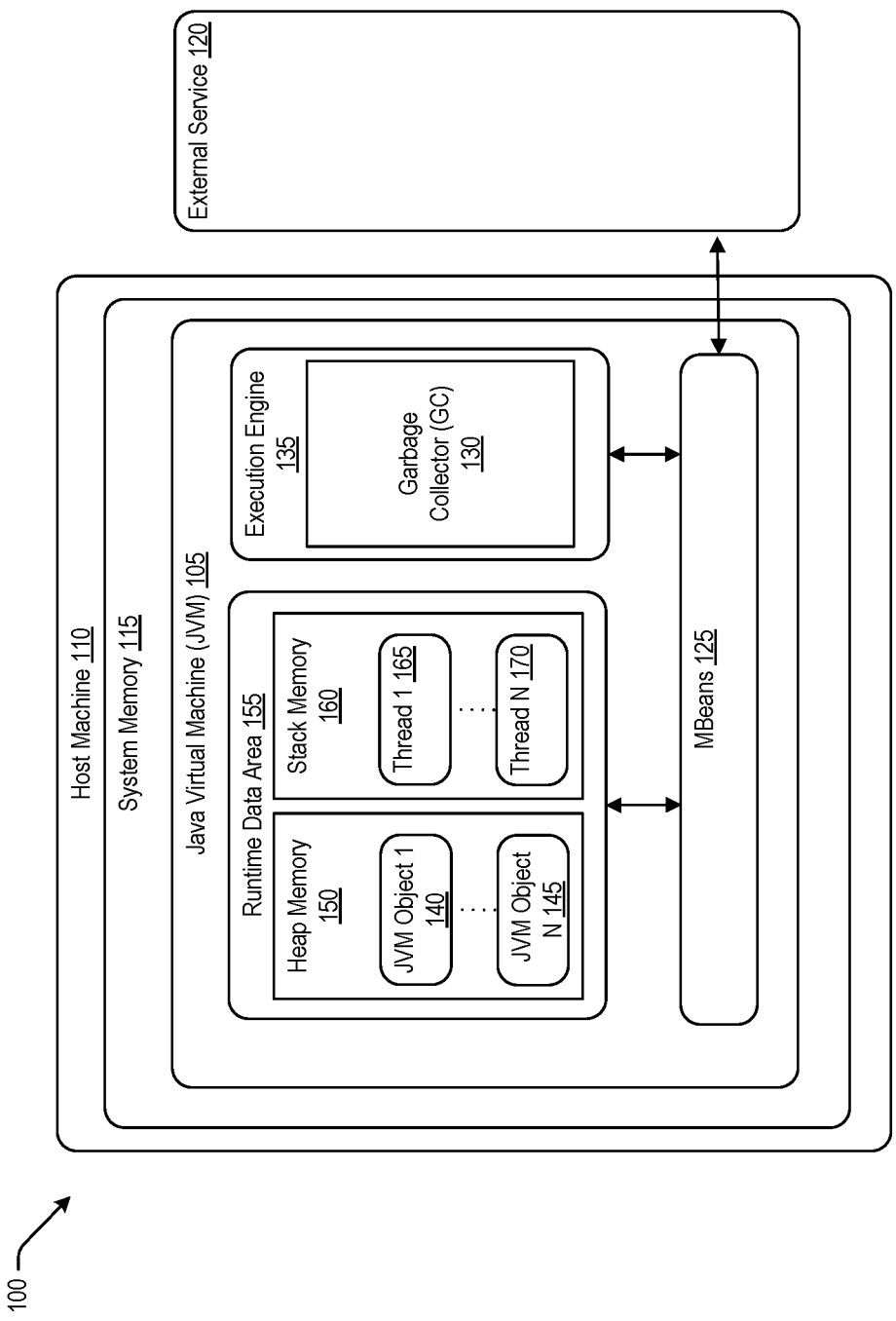
FIG. 1 is a simplified block diagram of a Java virtual machine (JVM) instance according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to tuning Java Virtual Machines (JVMs). More particularly, techniques are described for tuning a JVM in an automated manner. The automated tuning may be performed to improve a JVM's performance including to prevent it from failing. An auto-tuning system is described that can auto-detect one or more anomalous conditions for a JVM, and in response, take one or more corrective actions to auto-tune the JVM to avoid or reduce or mitigate any adverse impacts of the detected anomalous conditions. A corrective action taken for a JVM may include changing one or more values associated with one or more parameters associated with the JVM. Various embodiments are described herein, including methods, systems, non-transitory computer-readable media storing programs, code, or instructions executable by one or more processors, and the like.

A Java Virtual Machine (JVM) is a program or virtual machine that enables Java programs (and other programs written in other languages that are compiled to Java bytecode) to be run or executed on different devices and operating systems. A JVM program implements a JVM specification that formally describes what is required in a JVM program implementation. There are different versions of JVM specifications. Java code is first compiled into Java bytecode. This bytecode then gets interpreted on different machines and enables the bytecode to run on the different machines. A JVM converts Java bytecode into machine code that is specific to the machine (e.g., a host machine) or hardware platform on which the program is to be executed. A JVM thus enables portability of Java programs to different operating systems and machine platforms. A JVM is also responsible for memory management. JVMs are widely used in the industry to run different programs and applications.

A JVM can be managed using objects called managed beans (Mbeans) that follow design patterns defined in the Java Management Extensions (JMX) specification. MBeans are objects that can be instantiated within a JVM and which enable a JVM to receive commands (e.g., JMX commands) from a command source outside the JVM. A MBean can represent a device, application or any resource that needs to be managed, and a MBean can emit a notification in response to an event. One or multiple MBeans can be instantiated within a JVM. The Mbeans can be instantiated by an application running on the JVM during startup.

As indicated above, JVMs can be tuned to enhance their performance. Tuning involves changing one or more values of one or more parameters associated with a JVM to match the needs of the application executed by the JVM with a goal towards enhancing the performance of the application execution. For example, tuning a JVM can include adjusting the value of JVM-related parameters that control the size of the JVM's heap, choosing the appropriate garbage collector to be used by the JVM, and the like. Tuning a JVM may also involve performing tasks such as deleting memory objects in the JVM to free up memory. The values of JVM related parameters can include a maximum size of the heap, the maximum amount of free heap space after garbage collection, and a minimum amount of free heap space after garbage collecting.

Tuning a JVM is typically a manual task that can be error prone and labor intensive. Changes made during tuning can involve tradeoffs—for instance, increasing the value of parameters controlling the amount of JVM heap memory may increase the time between garbage collection cycles. Managing the tradeoffs can be difficult without specialized knowledge and, incorrect tuning of a JVM can result in degraded performance of the application executed by the JVM.

A user who is manually tuning a JVM may not be able to identify the various actions that can be taken nor understand the tradeoffs, and, in some circumstances, the user may take corrective actions that exacerbate the problem. Additionally, because the auto-tuning system continuously monitors for anomalies and automatically suggests corrective actions, the JVM auto-tuning system may cause the JVM to take corrective action before a user manually tuning a JVM would be aware of an issue. The JVM auto-tuning system can improve the reliability and performance of a JVM by causing the JVM to take corrective action before an anomaly has developed into a significant issue. Also typically, JVMs are often tuned reactively, i.e., in response to a problem after a problem has already occurred. This can be problematic since, in some instances, the problem may not be recoverable and it may be too late once a problem has occurred resulting in JVM failure. The auto-tuning system described herein provides a solution to these technical problems. The auto-tuning system described herein is able to proactively, and in an automated manner substantially free of any human intervention, detect issues with a JVM and taking appropriate corrective actions. This not only reduces or mitigates the adverse impacts of any JVM problems but also prevents problems from occurring.

In certain implementations, the JVM auto-tuning system is able to monitor a JVM's execution and automatically detect anomalous JVM behavior. The automated detection can be done using various techniques such as by using a pretrained model (e.g., an artificial intelligence/machine learning (AI/ML model)), or action rules. The system can detect anomalous JVM behavior (e.g., anomalies) seamlessly and without needing manual intervention by a user with specialized knowledge. In contrast to manual tuning, an auto-tuning system can continuously monitor a JVM's behavior for anomalies. Additionally, the JVM auto-tuning system is able to detect anomalies that may go unnoticed by someone manually tuning the JVM. Early detection can mean that an anomaly can be detected and corrective actions taken in response to the detection before the anomaly causes significant disruption to the JVM, for example, before the anomaly causes an actual problem to occur in the JVM.

The JVM auto-tuning system can identify one or more corrective actions to be performed responsive to a detected anomaly and causes the identified actions to be performed. The identified actions can include a garbage collector to delete one or more objects, changing parameters that control the amount of stack memory, changing parameters that control the amount of heap memory, generating an alarm (e.g., an error message), and the like. As discussed above, corrective actions can involve tradeoffs that impact the JVM's performance. a sequence of events that have a particular pattern for a particular period of time; google it!

The auto-tuning system can also be configured to auto-tune a JVM in response to seasonal trends or needs. A seasonal trend is a variation in state information for a JVM that occurs at specific regular intervals such as hourly, weekly, monthly, quarterly, yearly, over several years or over longer timeframes. State information for a JVM can comprise the amount of stack memory, the amount of heap memory, the number of objects in the heap memory, the percentage utilization of heap memory, the percentage utilization of stack memory, the presence or absences of an error message, etc. A seasonal trend can be that a JVM requires more heap space on weekdays and less heap space on weekends. Seasonal trends may put additional performance burdens on a JVM and the JVM may need to be tuned in anticipation of such seasonal trends to avoid problems.

Seasonal trends are generally industry-specific and can fluctuate based on time of year, time of day, customer characteristics, and the like. For instance, a New York brokerage firm may use one or more JVMs to execute applications that handle securities trading. The firm may experience increased trading transactions and thus increased demand between 7:00 am-9:00 am ET every weekday. In certain implementations, the JVM auto-tuning system described herein can anticipate these seasonal changes and take corrective actions. For example, the system may increase the heap space for the JVMs during the 7:00 am-9:00 am ET weekday period in anticipation of the increased load. As another example, an online-retailer (e.g., a toy retailer) may see increased online sales during particular times of the year such as in December around the holiday and Christmas period. In certain implementations, the JVM auto-tuning system described herein can anticipate these seasonal changes and take corrective actions. For example, the system may increase the heap space in December for JVMs that execute programs that handle online sales for the retailer.

In certain implementations, the anomalies detection, responsive auto-tuning, and seasonal tuning functionalities are offered via a cloud service provided by a cloud services provider (CSP), where the cloud service can be subscribed to by one or more customers. For example, a CSP may offer a "JVM auto-tuning cloud service." In certain embodiments, a customer subscribing to such a cloud service may be provided with a Software Development Kit (SDK) that enables "hooks" to be inserted into an application to call upon the JVM auto-tuning service. SDKs can be a collection of tools that allow a user to develop a platform-specific application on the cloud service. A SDK can include application programming interfaces (APIs) or libraries for a particular programming language. Accordingly, the functions offered by a JVM auto-tuning system can be provided by a cloud service provider as a service to subscribing customers.

FIG. 1 is a simplified block diagram 100 of a Java virtual machine (JVM) instance according to certain embodiments. The embodiment depicted in FIG. 1 is merely an example and is not intended to unduly limit the scope of claimed embodiments. One of ordinary skill in the art would recognize many possible variations, alternatives, and modifications. For example, in some implementations, block diagram 100 depicted in FIG. 1 may have more or fewer blocks or components than those shown in FIG. 1, may combine two or more blocks, or may have a different configuration or arrangement of blocks.

The JVM 105 can be a virtual machine (VM) that can run one or more computer programs written in the Java programming language. In some circumstances, JVM 105 can be a virtual machine that follows the JVM specification. JVM 105 can run on host machine 110, and the host machine can be a computing device with one or more processors and memory (e.g., system memory 115). Host machine 110 can provide computer resources to JVM 105. The computing device can be a server computer, a personal computer, a bare machine (BM), a system on a chip, a mobile device, etc. JVM 105 can run on system memory 115 for host machine 110.

The JVM can perform various memory management functions including garbage collection. For example, in FIG. 1, a garbage collection component 130 is responsible for performing garbage collection called garbage collecting. In the context or JVMs, garbage collecting is defined by the JVM specification and can include deleting unused objects (e.g., objects without any references) from the dynamically allocated memory (e.g., heap memory). A garbage collector (GC) 130 can perform garbage collection by identifying and deleting unused objects from heap memory. Unused objects may include unreferenced objects, called garbage, that can be deleted by GC 130. An unreferenced object, or eligible object, can be an object that does not reference another object and is not referenced by another object. Objects can be stored in heap memory and references to those objects can be stored in static memory (e.g., stack memory). When a process concludes, stack memory can be flushed, removing references, but unreferenced objects may remain in heap memory. GC 130 may not be able to delete a referenced object (e.g., an ineligible object).

GC 130 can be instructed to delete a specific eligible object using a Java object called a MBean. Objects, applications, or resources that need to be managed can be represented by a MBean such as Mbeans 125. MBeans can receive a command from a JVM auto-tuning service system such as JVM auto-tuning service system 205 described below with reference to FIG. 2. The command can be forwarded to the appropriate JVM subsystem (e.g., the execution engine 135). JVM 105 can expose a MBean representing the GC in response to a command from the JVM tuning service system. GC 130 can be instructed, via the MBean, to garbage collect specific eligible objects (e.g., JVM object 1 140, JVM object n 145, etc.). If GC 130 is instructed to delete an ineligible object, a message can be sent from the JVM execution engine 135 to the JVM auto-tuning service system via Mbeans 125. Messages can indicate whether a command sent to an MBean succeeded, failed, or was not executed.

Individual MBeans can be created to perform different functions. For instance, a MBean can relay instructions to send information from heap memory to the JVM tuning service. A MBean can relay instructions to change the amount of heap memory allotted to a JVM. MBeans can be provided as part of a software development kit (SDK) for Java, and MBeans, for a JVM, can be instantiated when the JVM is instantiated.

JVM 105 can communicate with an external service 120 via MBeans 125. External service 120 can be JVM auto-tuning service system 205, anomaly detection system 230, forecasting service system 245, etc. MBeans 125 can comprise one or more MBean instances and JVM related data can be sent from JVM 105 to external service 120 via MBeans 125.

Instructions received from external service 120 can be forwarded to JVM 105, or one of its components, via MBeans 125. For instance, a command to garbage collector (GC) 130 can be received at MBeans 125. The command can be forwarded by MBeans 125 to the GC 130 in execution engine 135. Execution engine 135 can comprise an interpreter to execute Java bytecode sequentially, a just in time (JIT) compiler to execute some bytecode in parallel, and GC 130. In some circumstances, JVM 105 can have more than one instance of execution engine, 135 and each thread running in JVM 105 can be a distinct instance of execution engine 135.

In this instance, the command sent to GC 130 is an instruction to perform garbage collecting. GC 130 can access JVM objects (e.g., JVM object 1 140, JVM object N 145) in heap memory 150. GC 130 can access heap memory 150 via execution engine 135. Heap memory 150 can be a partition of system memory 115 that is part of the runtime data area 155 for JVM 105. Runtime data area 155 can be divided into heap memory 150 and stack memory 160. New objects can be created in heap memory 150 and references to the objects can be stored in stack memory 160. Threads for JVM 105, such as thread 1 165 or thread N 170, can be executed in stack memory 160. Thread 1 165, or thread N 170, can be managed by JVM 105 and allocating threads may not require a system call.

An exemplary list of JVM objects in a JVM instance's heap memory (e.g., heap dump) is included below:

| JVM Object Class Name | Shallow Heap Memory | Retained Heap Memory | Percentage |
|---|---|---|---|
| org.languagetool.language.americanenglish @ 0x8820b760 | 64 B | 17.55 MB | 7.09% |
| com.intelliji.ide.plugins.cl.PluginClassLoader @ 0x83b843c8 | 152 B | 13.56 MB | 5.48% |
| com.intelliji.ide.plugins.cl.PluginClassLoader @ 0x831e4b48 | 152 B | 13.07 MB | 5.28% |
| com.intelliji.ide.plugins.cl.PluginClassLoader @ 0x83feec78 | 152 B | 7.89 MB | 3.19% |
| sun.awt.image.BufImgVolatileSurfaceManeger @ 0x83b843c8 | 48 B | 7.63 MB | 3.08% |
| ... | | ... | ... |

Tuning a JVM can be performed by a JVM auto-tuning service system. Tuning by the JVM auto-tuning service system can include corrective actions such as deleting objects that are behaving unusually. These objects can be detected using a trained machine learning model as part of an anomaly detection system. heap memory data or JVM thread data for an object can be input into the model, and the model can output a classification for the object. The object can be flagged by the anomaly detection system when the object is acting irregularly (e.g., outside of regular ranges) and but the object may not be flagged if the object is behaving normally (e.g., within regular ranges).

The anomaly detection system may be able to identify objects using rules based anomaly detection. An object can be identified as having an anomalous condition if the object violates one or more rules (e.g., action rules). The rules can include acceptable memory or thread parameters for an object. For example, an object may be identified as anomalous if the amount of memory allocated to the object, or the number of threads generated by an object, exceed a threshold. The threshold can be a raw amount (e.g., a number gigabytes (GB) of memory) or a percentage (e.g., the percentage of total memory allocated to a JVM or an object).

If an object is detected by the anomaly detection system, the JVM tuning service can instruct the JVM execution engine to perform garbage collection via a MBean. The GC for the JVM can delete eligible objects, but a GC may not be able to delete ineligible objects. An error message can be sent from the JVM execution engine to the JVM tuning system in response to a failed attempt to delete (e.g., garbage collect) an object.

The JVM tuning service system, in response to a failed garbage collected, may perform an alternative corrective action to tune the JVM. Corrective actions, and alternative corrective actions, can include garbage collecting, changing the value of parameters such as the parameter controlling the amount of heap memory, or changing parameters controlling the number of CPU cores assigned to the JVM. The JVM tuning system can instruct the JVM execution engine to take corrective actions via one or more MBeans.

Tuning can be performed in response to the current resource requirements for a JVM or a forecast of the JVM's future requirements. Resources can include the amount of heap memory or the number of CPU cores allotted to a JVM. A forecasting service system can predict a JVM's future resource requirements using a seasonal trend detection subsystem or trained models for forecasting. The predictions can be used by the JVM auto-tuning service system to tune the JVM.

Figure 2:
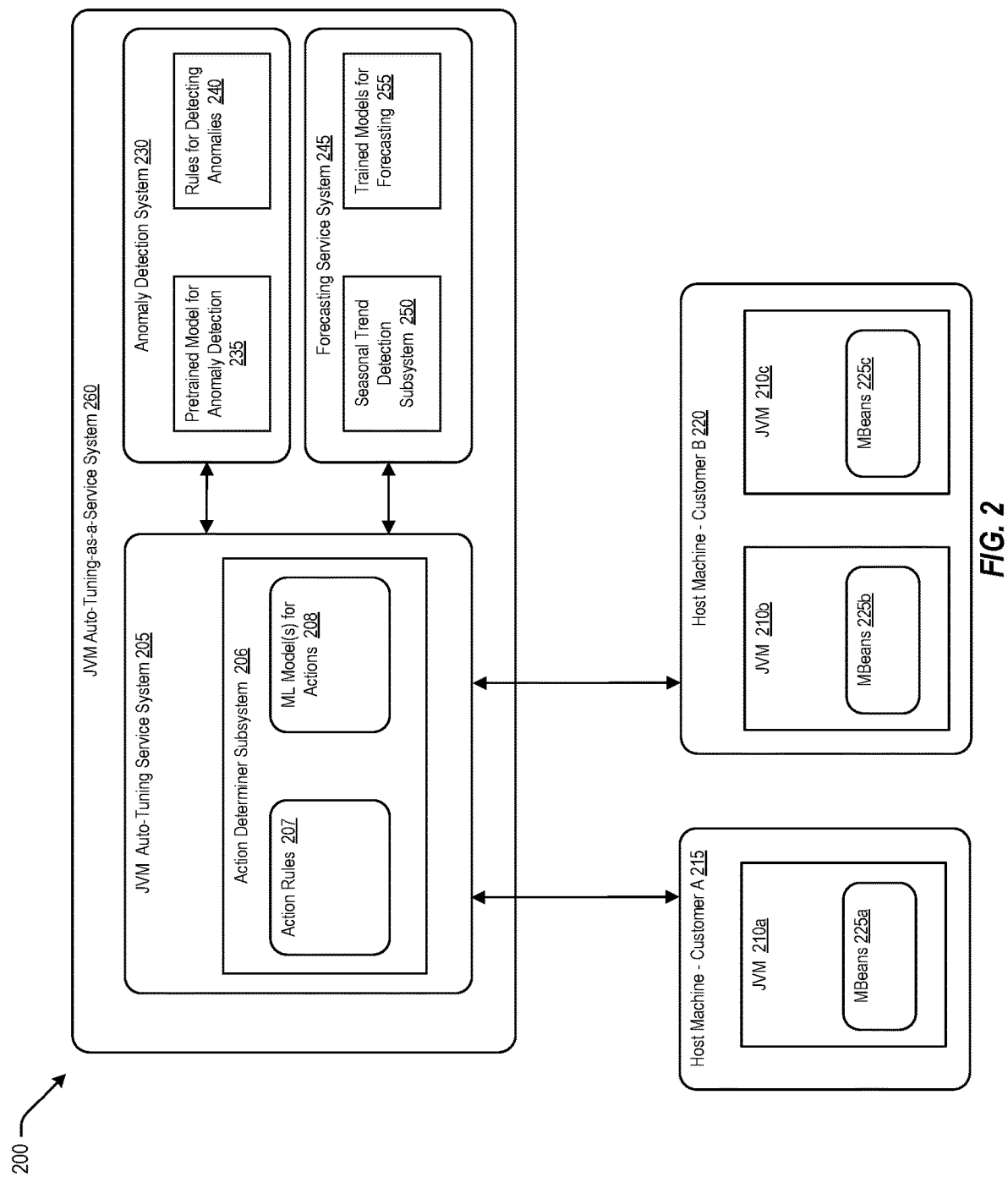
FIG. 2 is a simplified block diagram of a distributed system 100 for implementing a JVM tuning infrastructure according to certain embodiments.

FIG. 2 is a simplified block diagram of a distributed system 200 incorporating a JVM tuning infrastructure according to certain embodiments. The embodiment depicted in FIG. 2 is merely an example and is not intended to unduly limit the scope of claimed embodiments. One of ordinary skill in the art would recognize many possible variations, alternatives, and modifications. For example, in some implementations, distributed system 200 depicted in FIG. 2 may have more or fewer systems or components than those shown in FIG. 2, may combine two or more systems, or may have a different configuration or arrangement of systems.

As depicted in FIG. 2, the distributed system 200 comprises multiple systems communicably coupled to JVM tuning service system 205. The communication between the systems in distributed system 200 can be facilitated by JVM tuning service system 205. JVM auto-tuning service system can be one or more computing devices with one or more processors. The communication facilitated by JVM tuning service system 205 can comprise ingesting data from other systems, forwarding data between the systems, or sending commands to the other systems. JVM tuning service system 205 can be communicably coupled to the systems in distributed system 200 via a local connection or through a communication network. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols.

The JVM tuning service system 205 can be provided as part of a cloud service. The infrastructure that may be used to provide the cloud service is shown by the JVM autotuning-as-a-service system 260. The JVM auto-tuning-as-a-service system 260 can comprise one or more computing systems, memory resources, or networking resources that can be provided by a cloud service provider. A subscriber could subscribe to the service and the JVM auto-tuning-as-a-service system 260 can automatically monitor and tune the subscriber's JVMs as described herein.

In the embodiment depicted in FIG. 2, JVM tuning service system 205 can receive JVM related data from a JVM such as any one of JVMs 210*a-c*. JVM related data can comprise the amount of heap memory used by a JVM instance/JVM object, the amount of threads generated by a JVM instance/JVM object, the class of JVM objects, the number of CPU cores assigned to a JVM, the percentage of processing or memory capacity used by a JVM object, etc. The JVM related data can be received in response to a request sent from JVM tuning service system 205 to a JVM. A JVM can be hosted on a host machine, and, for example, JVM 210*a* can be hosted on host machine-customer A 215. A host machine, such as host machine-customer A 215 or host machine-customer B 220, can be a personal computer, a server computer, a virtual machine (VM), a bare machine (BM), etc. A host machine can host one or more JVM instances, and, for example, host machine-customer B 220 can host JVM 210*b* and JVM 210*c*.

Communication between JVM tuning service system 205 and a JVM can be facilitated by MBeans such as MBeans 225*a-c*. Communication to and from a JVM, including requests for JVM related data, outgoing JVM related data, or instructions to change the value of JVM related parameters, can be received at one or more MBeans. Mbeans can be a Java object that can represent JVM objects, applications, or resources. New MBeans can be exposed by the JVM in response to a command from JVM tuning service system 205.

JVM tuning service system 205 can communicate with anomaly detection system 230. Anomaly detection system 230 can monitor JVM related data sent from JVM tuning service system 205 to identify objects. The JVM related data can include a list of JVM objects including the memory utilization for the listed objects, or the number of threads generated by the objects. In some circumstances, the JVM related data can be filtered before the data is sent to anomaly detection system 230. For example, objects with a percentage memory utilization below a threshold may be excluded from the sent data (e.g., objects that use a small amount of available memory).

Anomaly detection system 230 can use the received JVM related data to identify objects. For example, received JVM related data, including data about one or more JVM objects, can be input into the pretrained model for anomaly detection 235. The pretrained model for anomaly detection 235 can be a machine learning model that uses the input JVM related data output a classification for the one or more JVM objects or one or more JVM instances (e.g., an individual JVM). The classification for a JVM object can be a determination that the object is behaving abnormally and flagged by the anomaly detection system object, an object that is behaving normally and not flagged by the anomaly detection system, or an unclassified object. Anomaly detection system 230 can classify a JVM object using rules based anomaly detection 240. Rules based anomaly detection 240 can classify a JVM object by comparing JVM related data for the object to one or more thresholds. For instance, an object can be classified as normal if the amount of threads generated by the object are below a threshold.

Anomaly detection system 230 can use predictions from forecasting service system 245 to classify JVM objects. The predictions can be input into pretrained model for anomaly detection 235 or rules based anomaly detection 240. The predictions can give context to changes in the JVM related data, and, for instance, an identical change to the JVM related characteristics for a JVM object may be anomalous in July but standard in October. The predictions can include seasonal predictions generated by the seasonal trend detection subsystem 250 or forecast predictions from the trained model for forecasting 255. The seasonal trend detection subsystem can use seasonal rules or a seasonal model to generate seasonal predictions. The predictions can be sent from the forecasting service system 245 to the anomaly detection system 230 via JVM tuning service system 205. In some instances, the forecasting service system 245 and anomaly detection system 230 can communicate directly.

A seasonal prediction can be a future demand for one or more computer resources determined by seasonal trend detection subsystem 250. The seasonal prediction can be a prediction of the demand for an individual JVM, a customer's JVMs, JVMs hosted in a geographic region, or JVMs for a group of customers. For example, seasonal trend detection subsystem may determine that there is an increased demand for heap memory for JVMs hosted in North American data centers during November. Seasonal predictions can reflect changes in demand over shorter or longer timescales. For instance the seasonal trend detection subsystem 250 may determine that a company has increased demand during evenings in North America. The seasonal trend detection subsystem 250 may make a seasonal prediction that there is a regular yearly increase in demand.

The seasonal trend detection subsystem 250 can use a seasonal model to predict future demand. The seasonal model can be a machine learning model that can forecast resource demand based on the time of year or customer location (e.g., December demand may be high for a customer in Atlanta but not for a customer in Osaka). A generalized machine learning model that was trained on aggregated data from multiple JVMs can be used as a seasonal model. The seasonal trend detection subsystem 250 can also use seasonal rules to determine seasonal changes in demand (e.g., create a rule that there is a 30% increase in demand for summer months in temperate climates).

The forecasting service system 245 can include trained models for forecasting that can predict future resource requirements. The trained models can predict resource requirements for individual JVMs or groups of JVMs. The groups of JVMs can include the JVMs for a particular customer, JVMs from a geographic region, or JVMs for a specific industry. The trained models can comprise one or more machine learning models (e.g., forecasting models) that were trained using time series data taken from a JVM or group of JVMs.

Time series data can be used to train a seasonal model or forecasting model to make predictions for the forecasting service system. The time series data used to train the models can be obtained from one or more JVMs via MBeans. Time series data can be information collected at regular intervals for one or more entities. For example, the time series data for a JVM can include the amount of heap memory used by a JVM. The time series data in this example can be collected by polling the JVM for memory data at five minute intervals. The JVM auto-tuning service system can poll the JVM for time series data via MBeans.

Seasonal predictions can be made using a trained machine learning model or using a rules based approach. JVM data obtained from JVM tuning service system 205 can be input into seasonal trend detection subsystem 250 and a seasonal prediction can be output. The prediction can be a time series forecast of demand for one or more computer resources at for a time period. For instance, a seasonal prediction can be a weekly percent change in a JVM's demand for heap memory over the next quarter (e.g., "week 1: +7% demand for heap memory, week 2 . . . ").

A forecasting prediction can be a future demand for one or more computer resources determined by one or more trained models for forecasting 255. The trained models comprising trained models for forecasting 255 or pretrained model for anomaly detection, can include a machine learning model that was trained on a training dataset comprising JVM related data. The training dataset can include time series JVM related data obtained from one or more JVM instances, one or more JVM instances associated with a customer, one or more JVM instances hosted in a geographic region, etc. In some instances the trained models can include a pretrained model trained on a general training dataset comprising JVM related data from a number of JVM instances (e.g., 100 instances, 1000 instances, 10,000 instances, 100,000 instances, 1,000,000 instances, 10,000,000 instances, 100,000,000 instances, etc.). The pretrained model can be retrained, or focused, on a JVM related data from a one or more JVM instances that were not included in the general JVM dataset. In some instances, the training dataset can be supplemented using data augmentation techniques.

An exemplary set of time series JVM related data is displayed below:

| Time stamp | Dynamically Allocated Memory Size | Serial Number (For maintaining sequence) |
| --- | --- | --- |
| 28-01-2022 05:24:00 | 249 MB | 1 |
| 28-01-2022 05:29:00 | 250 MB | 2 |
| 28-01-2022 05:33:00 | 255 MB | 3 |
| 28-01-2022 05:38:00 | 240 MB | 4 |
| 28-01-2022 05:43:00 | 230 MB | 5 |
| 28-01-2022 05:48:00 | 255 MB | 6 |

The trained model for forecasting 255 can receive time series JVM related data as an input and output a time series forecast for demand for computer resources over a specified time period (e.g., e.g., "January 2022: −4% demand for heap memory, February . . . "). A specified time period can be an hour, a day, a week, a month, a year, etc. Time series JVM related data can be JVM related data sampled at regular intervals over a specified time period.

A corrective action in response to a detected anomaly can be determined using action determiner subsystem 206. The corrective actions can include changes to heap memory 150 or stack memory 160. A corrective action can be a request for garbage collecting by GC 130. The corrective action can be determined using a trained model or a rules based approach. Machine learning (ML) models for actions can include one or more model(s) that are trained to determine one or more action(s) in response to detected anomalies. The models can be trained on data from general domains or on data taken from individual customers. Action rules 207 can include rules that can be used to determine a corrective action. The rules can be customer specific, for a particular JVM, or general for all JVMs. Action rules can include changes to the value of JVM related parameters controlling the amount of heap memory, the amount of stack memory, and the like. The action rules can comprise changes to the value of JVM related parameters that are taken in response to changes in JVM related state information including the amount of stack memory, the amount of heap memory, the number of objects in the heap memory, the percentage utilization of heap memory, the percentage utilization of stack memory, the presence or absence of an error message, etc. For instance, the action rules can include an instruction to garbage collect in response to the JVM heap memory utilization exceeding a threshold. The action rules can include an instruction in response to an error message. For instance, an instruction can include increasing the size of the heap memory after receiving an error message in response to an instruction to garbage collect a specific object in heap memory.

Figure 3:
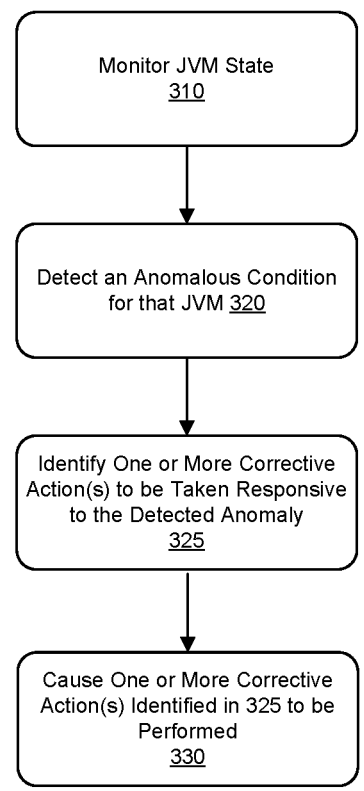
FIG. 3 is a simplified flowchart of a process for anomaly detection according to certain embodiments.

FIG. 3 is a simplified flowchart of a process for anomaly detection 300 according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. FIG. 3 depicts the interactions and data flows between the various systems or blocks depicted in FIGS. 1 and 2.

Turning to process 300 in greater detail, at block 310, the JVM state is monitored. JVM tuning service system 205, or external service 120, can send a request for JVM related state information to a JVM (e.g., virtual machine (VM), JVM 210*a-c*, JVM 105, etc.) operating on a host machine (e.g., host machine-customer A 215, host machine-customer B 220, etc.). The request can be received at a JVM via MBeans, such as MBeans 225*a-c*, and the MBeans can instruct components in the JVM to collect the requested JVM related data. For example, MBeans 125 can communicate with runtime data area 155 or execution engine 135 to collect JVM related state information. The JVM related state information can be time series data. The JVM related state information can include the amount of stack memory, the amount of heap memory, the number of objects in the heap memory, the presence of one or more error messages, the percentage utilization of heap memory, the percentage utilization of stack memory, etc.

Continuing the example, collected JVM related data can be sent from JVM 105 to external service 120 via MBeans 125. External service 120 can be JVM tuning service system 205, anomaly detection system 230, forecasting service system 245, etc. In some circumstances, JVM tuning service system 205 can receive requested JVM related data from a JVM and forward the data to anomaly detection system 230 or forecasting service system 245.

At block 320, an anomalous condition is detected for the JVM. An anomaly, or anomalous condition, can be detected by providing the requested JVM related state information to the pretrained model for anomaly detection 235 or the rules based anomaly detection 240 in anomaly detection system 230. In some circumstances, the JVM related state information can be provided to seasonal trend detection subsystem 250 or trained models for forecasting 255 in forecasting service system 245. Seasonal predictions or forecasting predictions produced using the requested JVM related state information can be forwarded, via a direct connection or via JVM tuning service system 205, to anomaly detection system 230. Pretrained model for anomaly detection 235, or rules based anomaly detection 240, can use one or more of the requested JVM related state information, seasonal predictions, or forecasting predictions to identify an anomalous condition including one or more objects in heap memory 150. In some circumstances, pretrained model for anomaly detection 235 can be a time series model.

At block 325, one or more corrective action(s) can be identified. The corrective actions can be responsive to the detected anomaly. The corrective actions a can be identified by the action determiner subsystem 206. Action rules 207 can determine a corrective action using a rules based approach. Machine learning (ML) model(s) for actions 208 can include one or more trained machine learning models that can identify anomalies.

The corrective actions can include instructing the JVM to perform garbage collection, changing the amount of memory allocated to the JVM, or changing the number of CPU cores allocated to the JVM. The corrective action can include an instruction from JVM auto-tuning service system 205 to delete one or more individual eligible objects (e.g., JVM object 1 140, JVM object N 145, etc.) in the heap memory (e.g., heap memory 150, etc.). In some circumstances, the corrective action can include an instruction to perform garbage collection without identifying individual eligible objects that should be deleted. The instruction can be provided by JVM auto-tuning service system 205 to a JVM via MBeans. In some circumstances, the corrective action can be an instruction to migrate one or more JVM instances (e.g., virtual machine (VM), JVM 210*a-c*, JVM 105, etc.) to from a first host device (e.g., host machine-customer A 215, host machine-customer B 220, host machine 110, etc.) to one or more different host devices.

At block 330, one or more corrective action(s) targeted to the JVM being monitored can be issued. An instruction to perform a corrective action can be issued by JVM tuning service system 205 via MBeans such as MBeans 225*a-c*, MBeans 125, etc. In some circumstances, JVM tuning service system 205 can provide a notification to a customer operating the JVM instance via a user interface (UI), application programming interface (API), etc. The notification can indicate that an object has been identified, a corrective action has been taken, a corrective action will be taken, or prompt the user to select a corrective action from a list of potential corrective actions.

Figure 4:
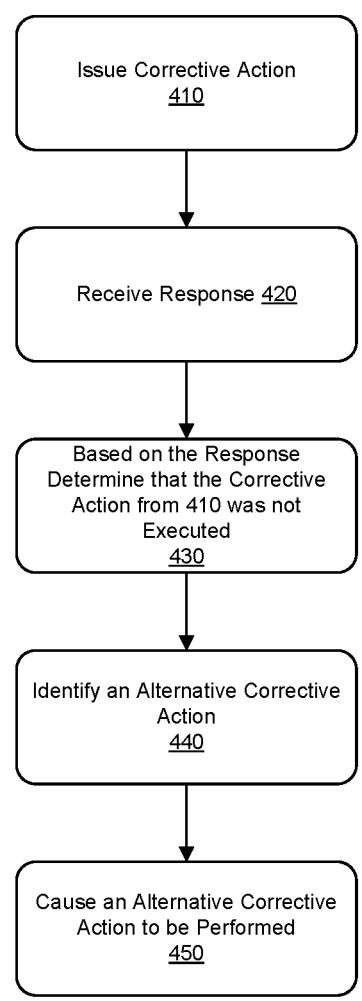
FIG. 4 is a simplified flowchart of a process for issuing an alternative corrective action according to certain embodiments.

FIG. 4 is a simplified flowchart of a process for anomaly detection 400 according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. FIG. 4 depicts the interactions and data flows between the various systems or blocks depicted in FIGS. 1 and 2.

Turning to process 400 in greater detail, at block 410, a corrective action is issued. In The corrective action can be issued to a JVM (e.g., virtual machine (VM), JVM 210*a-c*, JVM 105, etc.) by an external service (e.g., external service 120, JVM tuning service system 205, etc.) via MBeans (e.g., MBeans 225*a-c*, MBeans 125, etc.). The corrective action can be issued by the action determiner subsystem 206 using action rules 207 or ML model(s) for actions 208. The corrective actions can include instructing the JVM to perform garbage collection, changing the amount of memory allocated to the JVM, or changing the number of CPU cores allocated to the JVM, migrating the JVM to a different host, and the like. The corrective action can include an instruction from JVM tuning service system 205 to delete one or more individual eligible objects (e.g., JVM object 1 140, JVM object N 145, etc.) in the heap memory (e.g., heap memory 150, etc.). The corrective action can be an instruction to perform garbage collection without identifying individual eligible objects that should be deleted. The instruction can be provided by JVM tuning service system 205 to a JVM via MBeans.

At block 420, a response can be received. The response can be received from a JVM (e.g., virtual machine (VM), JVM 210*a-c*, JVM 105, etc.) at an external service (e.g., external service 120, JVM tuning service system 205). For example, the external service can be a user interface (UI) or application programming interface (API). The response can indicate that the corrective action was performed successfully or that the corrective action failed. For instance, an instruction to perform garbage collection can fail if there are no eligible objects to garbage collect, or if an individual object identified in an instruction to perform garbage collecting is ineligible (e.g., if a reference to the identified object is stored in stack memory 160). An instruction can fail, for example, if there is no available memory or CPU cores on the host device (e.g., host machine 110, etc.) that can be allocated to the JVM (e.g., virtual machine (VM), JVM 210*a-c*, JVM 105, etc.). The response can indicate at least one of: one or more corrective actions issued at block 410, whether an issued corrective action was successful, a reason an issued corrective action was unsuccessful, etc.

At block 430, based on the response, it can be determined that the corrective action from 510 was not executed. In some circumstances, whether the corrective action was executed can be determined by monitoring JVM related state information or using the response message from 410. As an example, a response from the JVM can indicate that an initial corrective action failed. In this example, the initial corrective action can be an attempt to garbage collect an object (e.g., JVM object 1 140, JVM object N 145, etc.) that fails because stack memory 160 contains a reference to the object. A response can be sent from the JVM, via MBeans (e.g., MBeans 225*a-c*, MBeans 125, etc.), to the JVM auto-tuning service system 205. JVM auto-tuning service system 205 can send a response to increase the heap memory in response to the failed initial corrective action.

At block 440, an alternative corrective action can be identified. The alternative corrective action can be issued by the action determiner subsystem 206 using action rules 207 or ML model(s) for actions 208. An alternative corrective action can be the same as the corrective actions from 410. Alternative corrective actions can include an instruction to garbage collect, an instruction to change the size of the heap memory assigned to the JVM, an instruction to migrate the host device to a different host device, etc.

At block 430, the JVM auto-tuning service system can cause an alternative action to be performed. The alternative corrective action can be issued to a JVM (e.g., virtual machine (VM), JVM 210*a-c*, JVM 105, etc.) from an external service (e.g., external service 120, JVM tuning service system 205, etc.) via MBeans (e.g., MBeans 225*a-c*, 125, etc.). In some circumstances, a user can be prompted, via a user interface (UI) or application programming interface (API), to select an alternative corrective action from a list of corrective actions. An alternative corrective action can be the same action as the initial corrective action from block 410.

Figure 5:
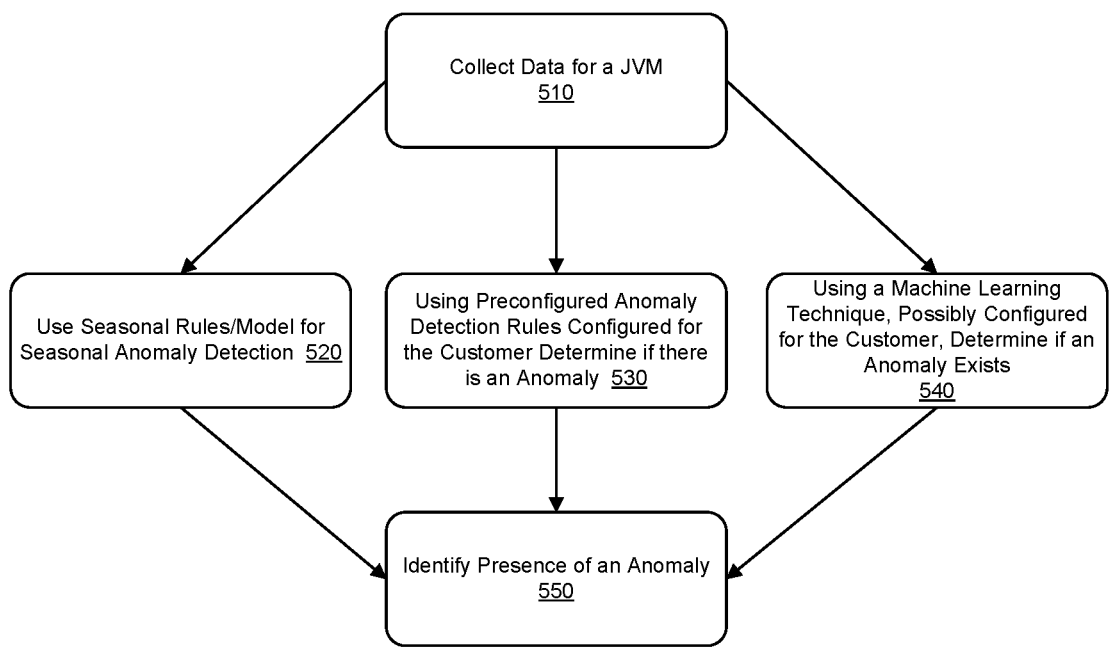
FIG. 5 is a simplified flowchart of a process for identifying the presence of an anomaly to certain embodiments.

FIG. 5 is a simplified flowchart of a process for forecasting according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. FIG. 5 depicts the interactions and data flows between the various systems or blocks depicted in FIGS. 1 and 2.

At block 510, data is collected. The data can be JVM related state information that is collected from a JVM instance (e.g., virtual machine (VM), JVM 210a-c, JVM 105, etc.). The JVM related data can be collected at regular intervals or in response to a request. The JVM related data can be time series data. A request can be sent from an external service (e.g., JVM tuning service system 205, forecasting service system 245, anomaly detection system 230, external service 120, etc.) to a JVM instance via MBeans (e.g., MBeans 225a-c, MBeans 125, etc.). The data can be provided to forecasting service system 245 in response to a request or at scheduled intervals. The data can be directly provided to forecasting service system 245 or via JVM tuning service system 205.

At block 520, seasonal rules or seasonal models can be used for seasonal anomaly detection. Seasonal trend detection system 250 can use the provided data or state information from block 510 to identify seasonal trends that can be used by anomaly detection system 230 to detect anomalies. A seasonal trend can be a change in JVM state information based on temporal information. For instance, a particular customer's JVM may have increased demand during the daylight hours for India. The seasonal trend can give context that can help pretrained models for anomaly detection 235, or rules for detecting anomalies 240, identify anomalies. Continuing the example, an increase in demand during daylight hours in India may cause the pretrained model for anomaly detection 235 to detect an anomaly without a seasonal trend provided by seasonal trend detection subsystem 250.

At block 530, preconfigured action rules can be used to determine if there is an anomaly. The preconfigured action rules can be configured for the customer. The action rules, such as rules for detecting anomalies 240, can use data or state information from 510 to detect one or more anomalies. For instance, a rule can be a threshold number of objects in the heap memory where garbage collection is performed if the number of objects exceeds a threshold. The rules can include a maximum or minimum percentage of heap memory or stack memory and if the maximum percentage is exceeded the memory can be increased. If the amount of memory is less than the minimum percentage, the amount of heap memory or stack memory can be decreased.

At block 540, whether an anomaly exists can be determined using machine learning techniques. The machine learning model can be configured for the customer. For instance, the machine learning model can be trained from an algorithm using customer specific training data (e.g., data from one or more of the customer's JVMs). The machine learning model, such as trained models for forecasting 255 or pretrained model for anomaly detection 235, can use the provided data from block 510 to generate a forecasting prediction.

At block 550, the presence of an anomaly can be identified. Identifying the presence of an anomaly can mean locating one or more anomalies detected in blocks 520, 530, or 540. The resources can be changed in response to an identified anomaly. The resources can be changed in response to a determination by action determiner subsystem 206. Changing the resources can mean changing the amount of computer resources available to the JVM (e.g., virtual machine (VM), JVM 210a-c, JVM 105, etc.). The computer resources can include heap memory 150, stack memory 160, system memory 115, etc. Changing the computer resources can mean migrating one or more JVM instances from a first host device (e.g., host machine-customer A 215, host machine-customer B 220, host machine 110, etc.) to one or more different host devices.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
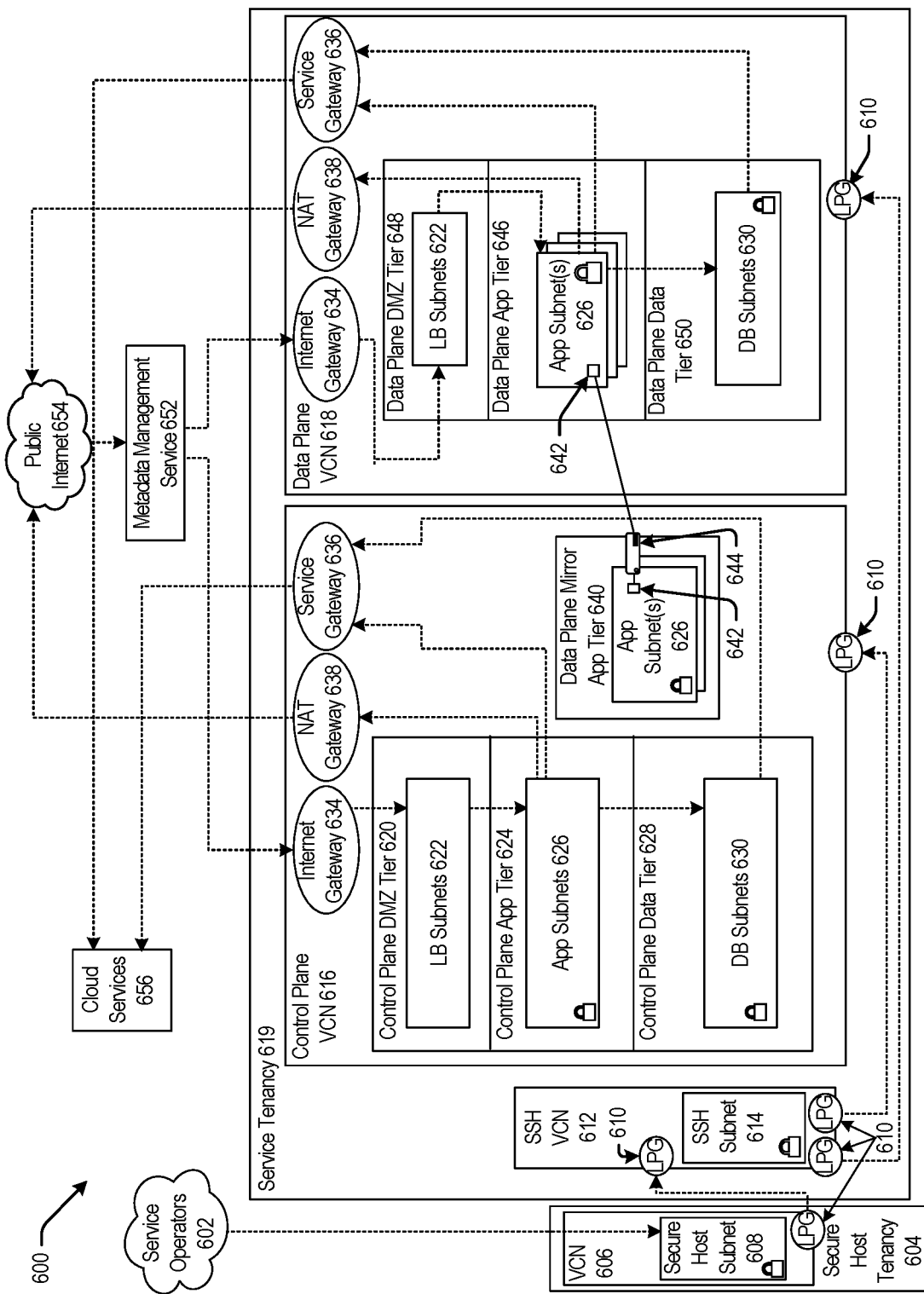
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 7, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
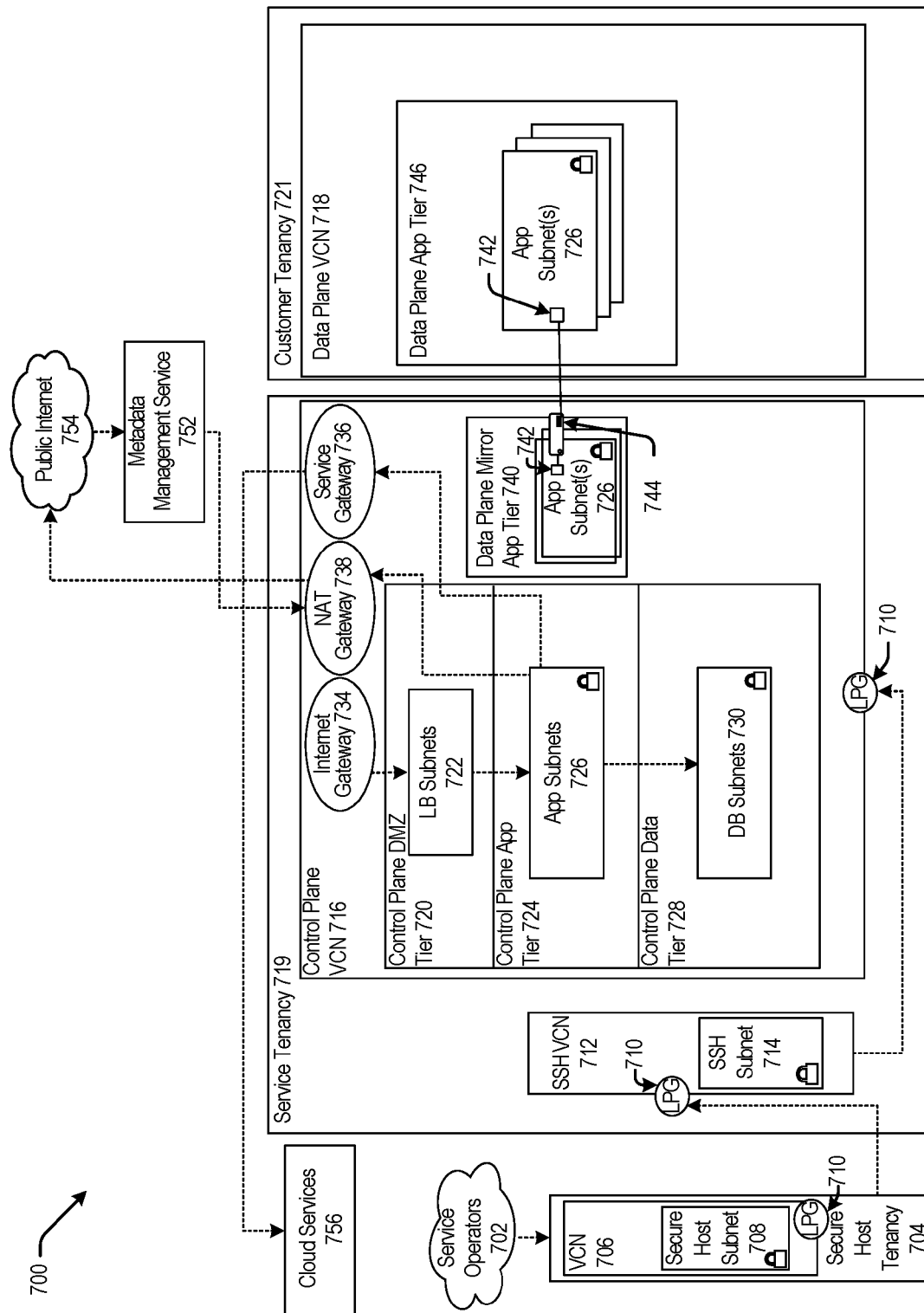
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
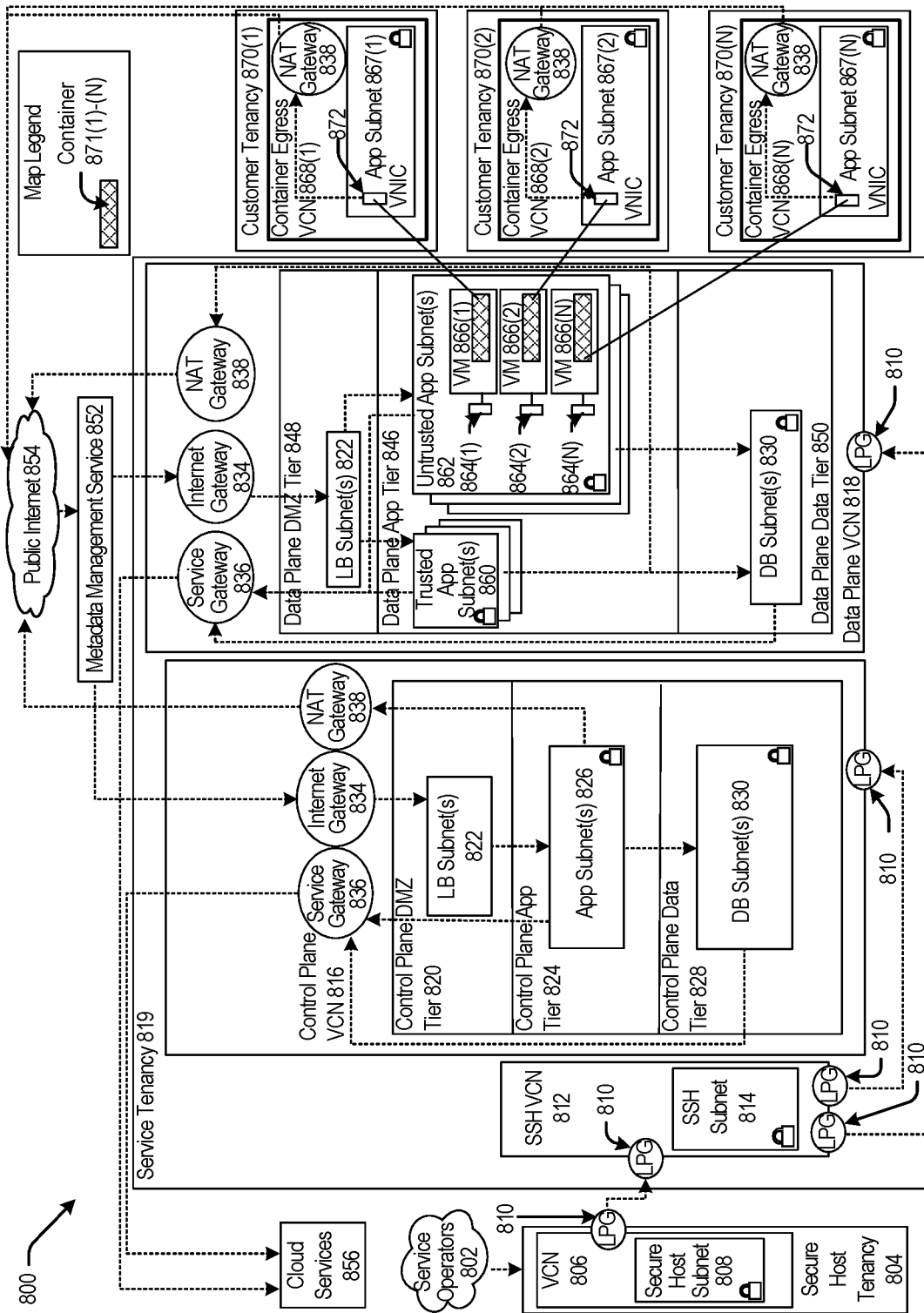
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
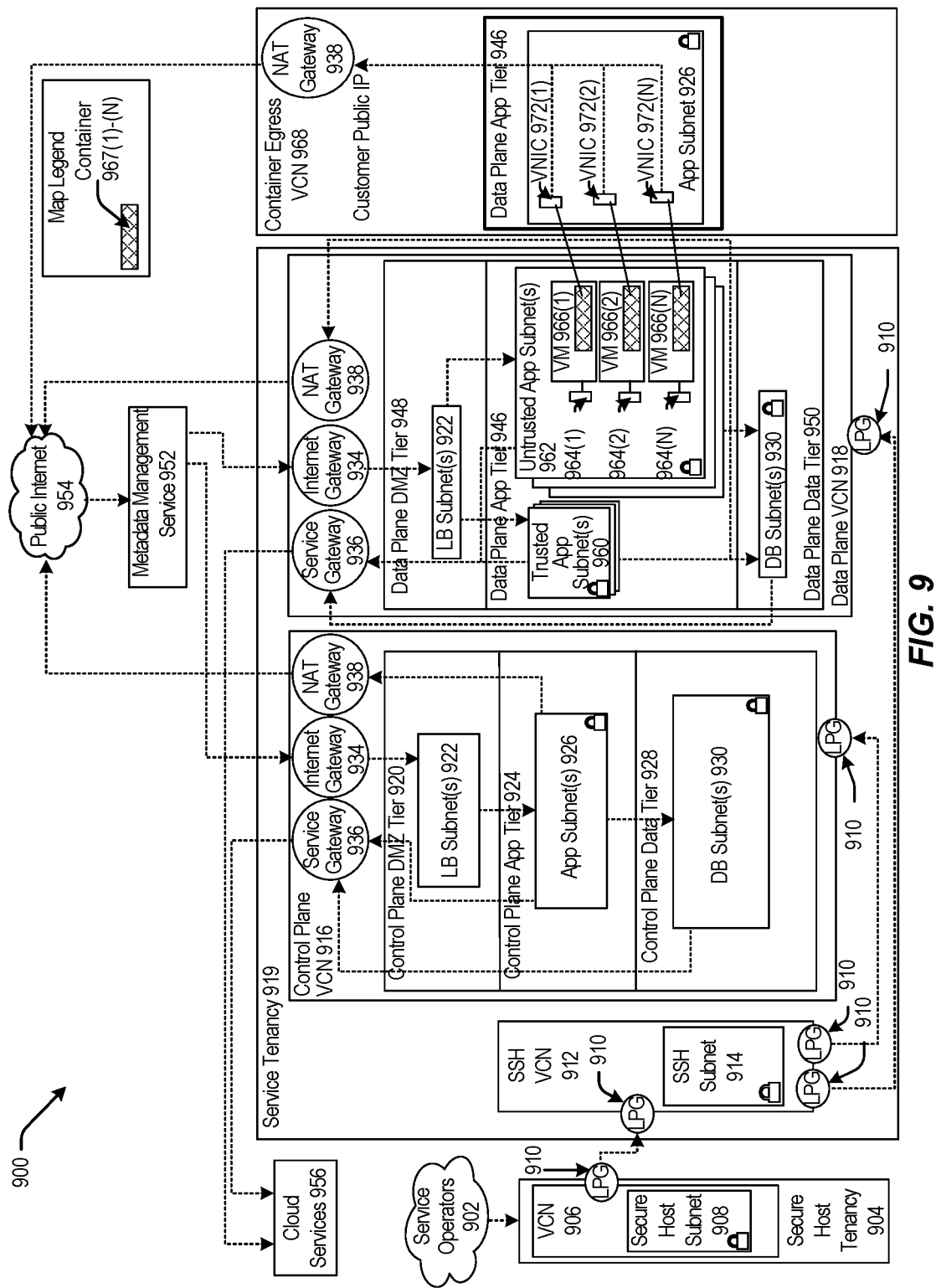
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
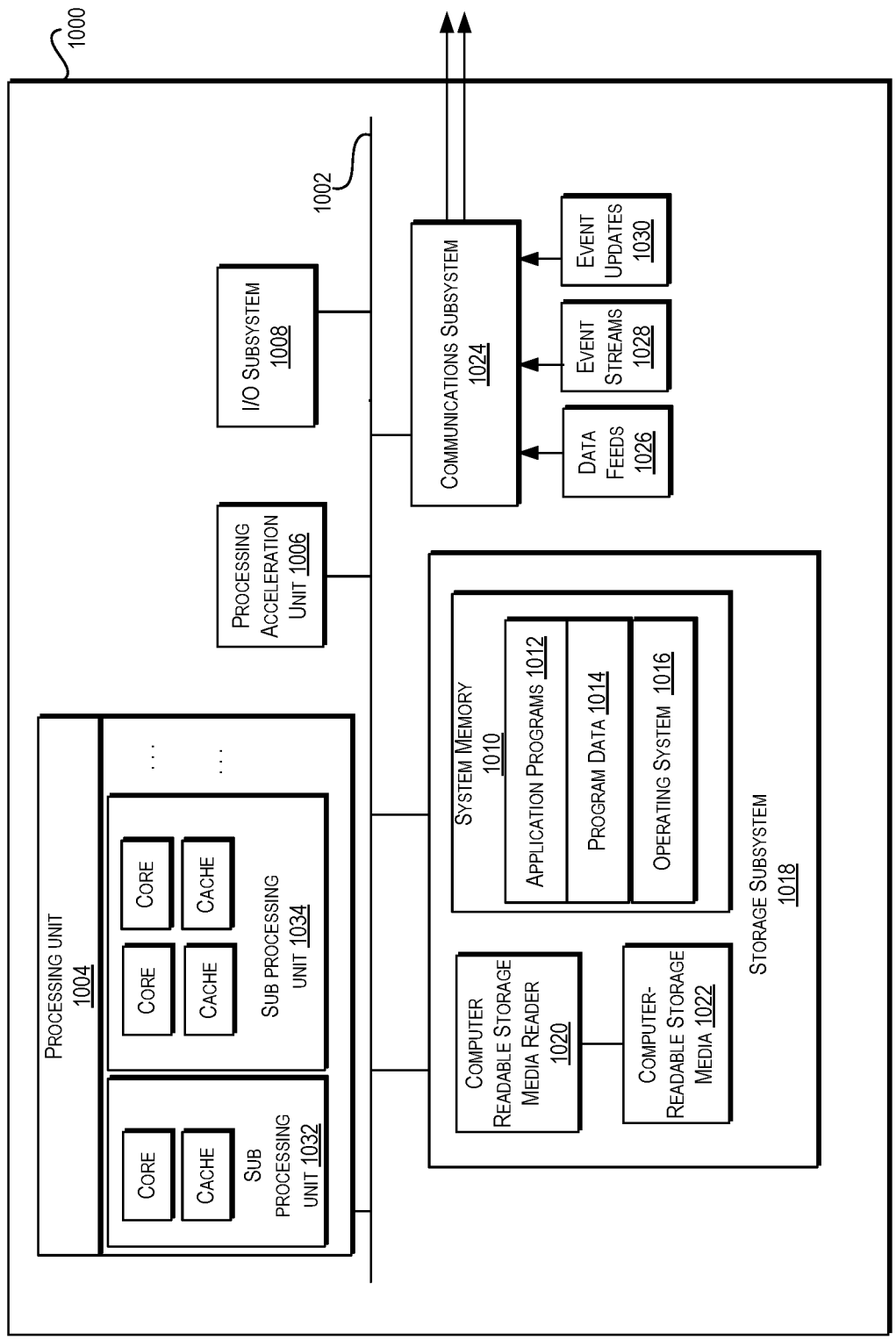
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage sub system 1018 and a communications sub system 1024. Storage sub system 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 702.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   providing, using infrastructure provided by a cloud service provider (CSP), a first cloud service for tuning Java Virtual Machines (JVMs), wherein the first cloud is subscribed to by a plurality of customers; and
   for a first customer from the plurality of customers subscribing to the first cloud service, performing processing comprising:
      monitoring, by a computer system comprising one or more processors, a first Java Virtual Machine (JVM) associated with the first customer;
      detecting, by the computer system, a first anomalous condition for the first JVM associated with the first customer;
      identifying, by the computer system, a first corrective action to be performed on the first JVM associated with the first customer responsive to the first anomalous condition; and
      causing, by the computer system, the first corrective action to be performed for the first JVM associated with the first customer, wherein the first corrective action causes a value of a parameter associated with the first JVM associated with the first customer to be changed or causes an object to be removed from a memory of the first JVM associated with the first customer.

2. The method of claim 1, wherein the detecting comprises:
   identifying, by a computer system, an unreferenced object in the memory of the first JVM.

3. The method of claim 2 wherein the detecting comprises:
   causing, by the computer system, the first JVM to delete the unreferenced object from the memory.

4. The method of claim 1, wherein causing the first corrective action to be performed comprises:
   changing a value of a parameter for the first JVM that causes a size of the memory of the first JVM to be changed.

5. The method of claim 1, wherein detecting the first anomalous condition comprises using an action rule to detect the first anomalous condition, wherein the action rule identifies a condition associated with the first JVM.

6. The method of claim 1, wherein detecting the first anomalous condition comprises providing state information for the first JVM to a machine learning (ML) model, and using a prediction provided by the ML model to identify the first anomalous condition.

7. The method of claim 1, further comprising:
   based on historical data, identifying a seasonal trend for the first JVM applicable for a specific period of time.

8. The method of claim 7, further comprising:
   building a seasonal model or a set of seasonal rules based on the seasonal trend;
   wherein identifying the first anomalous condition comprises using the seasonal model or the set of seasonal rules for identification of the first anomalous condition.

9. The method of claim 1, further comprising:
   receiving, by the computer system, a response from the first JVM indicating that the first corrective action failed to execute;
   identifying, by the computer system, an alternative corrective action to be performed, wherein the alternative corrective action is different from the corrective action that failed to execute; and
   causing, by the computer system, the alternative corrective action to be performed.

10. The method of claim 1, further comprising:
for a second customer from the plurality of customers subscribing to the first cloud service, performing processing comprising:
monitoring, by a computer system, a second Java Virtual Machine (JVM) associated with the second customer;
detecting, by the computer system, a second anomalous condition for the second JVM associated with the second customer; identifying, by the computer system, a corrective action to be performed on the second JVM associated with the second customer responsive to the second anomalous condition; and
causing, by the computer system, a second corrective action to be performed for the second JVM associated with the second customer, wherein the second corrective action causes a value of a parameter associated with the second JVM associated with the second customer to be changed or causes a second object to be removed from a memory of the second JVM associated with the second customer.

11. The method of claim 1, wherein monitoring the first JVM comprises monitoring at least one of a number of a set of memory objects stored in the memory of the first JVM, an amount of heap memory in the memory of the first JVM, an amount of stack memory in the memory of the first JVM, or a number of threads executed by applications running on the first JVM.

12. A system comprising:
one or more processors configured to:
provide, using infrastructure provided by a cloud service provider (CSP), a first cloud service for tuning Java Virtual Machines (JVMs), wherein the first cloud is subscribed to by a plurality of customers; and
for a first customer from the plurality of customers subscribing to the first cloud service, performing processing comprising:
monitor a first Java Virtual Machine (JVM) associated with the first customer;
detect a first anomalous condition for the first JVM associated with the first customer;
identify a first corrective action to be performed on the first JVM associated with the first customer responsive to the first anomalous condition; and
cause the first corrective action to be performed for the first JVM associated with the first customer, wherein the first corrective action causes a value of a parameter associated with the first JVM associated with the first customer to be changed or causes an object to be removed from a memory of the first JVM associated with the first customer.

13. The system of claim 12, wherein the processors are further configured to:
identify an unreferenced object in the memory of the first JVM.

14. The system of claim 13, wherein the processors are further configured to:
cause the first JVM to delete the unreferenced object from the memory.

15. The system of claim 12, wherein the processors are further configured to:
change a value of a parameter for the first JVM that causes a size of the memory of the first JVM to be changed.

16. The system of claim 12, wherein monitoring the first JVM comprises monitoring at least one of a number of a set of memory objects stored in the memory, an amount of heap memory in the memory, an amount of stack memory in the memory, or a number of threads executed by applications running on the first WM.

17. A non-transitory computer-readable medium storing a set of instructions, the set of instructions when executed by one or more processors cause processing to be performed comprising:
providing, using infrastructure provided by a cloud service provider (CSP), a first cloud service for tuning Java Virtual Machines (JVMs), wherein the first cloud is subscribed to by a plurality of customers; and
for a first customer from the plurality of customers subscribing to the first cloud service, performing processing comprising:
monitoring, by a computer system comprising one or more processors, a first Java Virtual Machine (JVM) associated with the first customer;
detecting, by the computer system, a first anomalous condition for the first JVM associated with the first customer;
identifying, by the computer system, a first corrective action to be performed on the first JVM associated with the first customer responsive to the first anomalous condition; and
causing, by the computer system, the first corrective action to be performed for the first JVM associated with the first customer, wherein the first corrective action causes a value of a parameter associated with the first JVM associated with the first customer to be changed or causes an object to be removed from a memory of the first JVM associated with the first customer.

18. The non-transitory computer-readable medium of claim 17, wherein the first anomalous condition is detected using a rules based approach.

19. The non-transitory computer-readable medium of claim 17, wherein the instruction further comprise:
based on historical data collected for a customer, identifying a seasonal trend for the customer, the seasonal trend applicable for a specific period of time; and
building a seasonal model or a set of seasonal rules based on the seasonal trend, wherein identifying the first anomalous condition comprises using the seasonal model or the set of seasonal rules for identification of the first anomalous condition.

* * * * *

UNITED STATES PATENT AND TRADEMARK OFFICE
CERTIFICATE OF CORRECTION

| | | |
|---|---|---|
| PATENT NO. | : 12,001,269 B2 | Page 1 of 1 |
| APPLICATION NO. | : 17/865237 | |
| DATED | : June 4, 2024 | |
| INVENTOR(S) | : Sinha | |

It is certified that error appears in the above-identified patent and that said Letters Patent is hereby corrected as shown below:

In the Specification

In Column 5, Line 8, delete "a" and insert -- A --, therefor.

In Column 7, Line 46, delete "Maneger" and insert -- Manager --, therefor.

In Column 7, Line 55, delete "heap" and insert -- Heap --, therefor.

In Column 13, Line 64, before "The" delete "In", therefor.

In Column 26, Line 43, delete "sub system" and insert -- subsystem --, therefor.

In Column 26, Line 43, delete "sub system" and insert -- subsystem --, therefor.

In Column 26, Line 44, delete "sub system" and insert -- subsystem --, therefor.

In the Claims

In Column 34, Line 14, in Claim 16, delete "WM." and insert -- JVM. --, therefor.

Signed and Sealed this
First Day of October, 2024

Katherine Kelly Vidal
*Director of the United States Patent and Trademark Office*